May 5, 1959 W. R. CLARK 2,884,788
CABLE TRANSMISSION SYSTEMS FOR RECORDERS
Filed Sept. 17, 1957 2 Sheets-Sheet 1

May 5, 1959 W. R. CLARK 2,884,788
CABLE TRANSMISSION SYSTEMS FOR RECORDERS
Filed Sept. 17, 1957 2 Sheets-Sheet 2
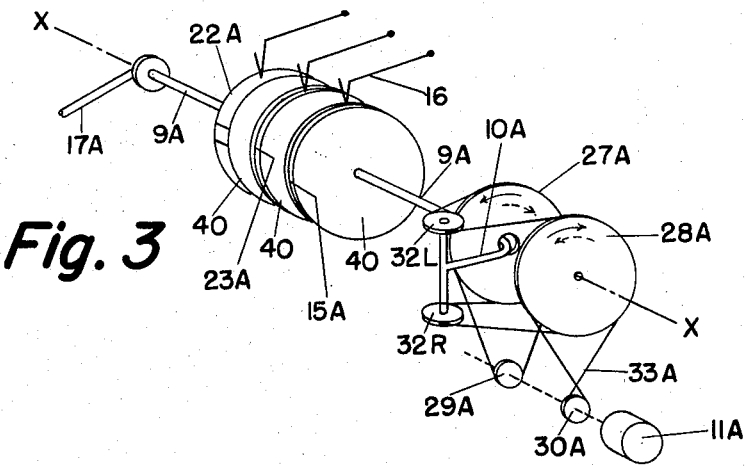
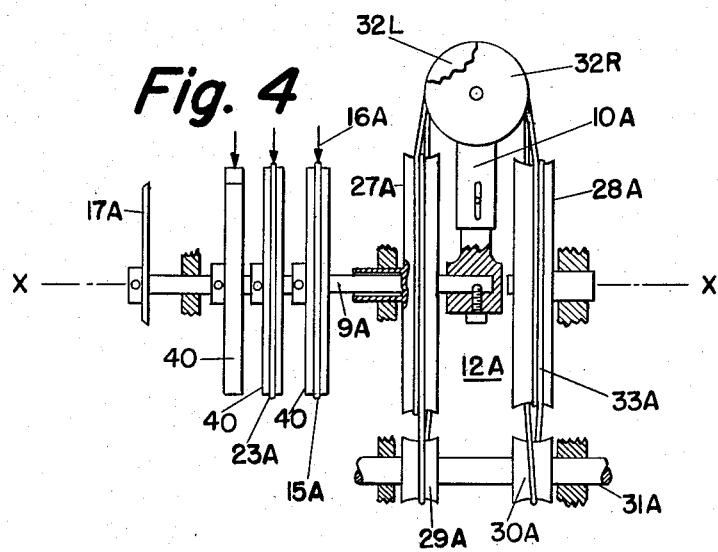
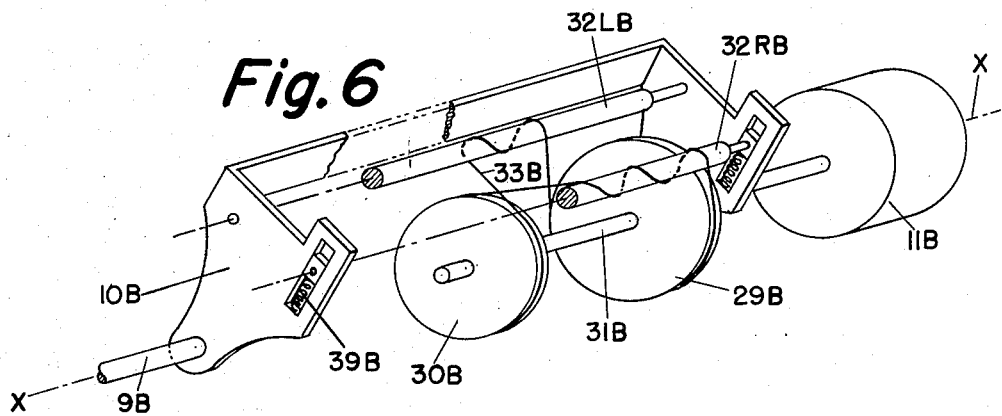

United States Patent Office 2,884,788
Patented May 5, 1959

2,884,788

CABLE TRANSMISSION SYSTEMS FOR RECORDERS

William Russell Clark, Jenkintown, Pa., assignor to Leeds and Northrup Company, Philadelphia, Pa., a corporation of Pennsylvania Application September 17, 1957, Serial No. 684,575

9 Claims. (Cl. 74—10.7)

This invention relates to recorders, controllers and indicators—for brevity hereinafter termed recorders—of the type in which a carriage is positioned in accordance with the magnitude of a measured variable, such as temperature, pressure or the like, by a reversible motor energized in sense corresponding with the changes in magnitude of the measured variable.

In prior arrangements, the transmission system from the motor to the carriage included a speed-reduction mechanism, such as worm gearing, spur gearing, or the like, and a cable drive from the speed-reduction mechanism to the recorder carriage. In accordance with the present invention, transmission of driving power and speed reduction are both effected by a cable and pulley system, so eliminating a separate speed-reduction mechanism.

More specifically, the recorder carriage is provided with pulley means, or equivalent, over which pass the two looped end sections of a folded endless cable loop. The aforesaid two end sections of the loop extend away from the carriage in different directions and, intermediate said end sections, the opposite sides of the cable loop respectively pass over two pulleys concurrently driven at different peripheral velocities by the driving motor. When the motor is energized in either sense, a corresponding one of the end loop sections is shortened, and the other end section correspondingly lengthened at a rate dependent upon the difference between the peripheral velocities of the drive pulleys, so to effect positive drive of the recording carriage and amplification of the motor torque.

More particularly, in recorders having a linearly movable carriage, the end sections of the loop are guided by pairs of pulleys having fixed axes of rotation beyond the opposite limits of travel of the carriage. In the preferred construction, the pulleys of one of these pairs are attached to the motor shaft and are of slightly different diameters to serve as the differential-drive pulleys as well as guide pulleys. In recorders having an angularly movable carriage, the loop end sections extend directly to motor-driven pulleys having a fixed axis of rotation coincident with that of the carriage: these driving pulleys are of slightly different diameter for high step-up of the motor torque.

The invention further resides in features of construction, combination and arrangement hereinafter described and claimed.

For a more detailed understanding of the invention, reference is hereinafter made to the accompanying drawings in which:

Fig. 1 schematically illustrates a recorder-controller indicator embodying one form of the invention;

Fig. 3 is a simplified perspective view of a recorder in which the carriage is angularly movable;

Fig. 4 is a side elevational view, partly in section, of the recorder of Fig. 3;

Fig. 6 is a simplified perspective view of another arrangement having an angularly movable carriage.

Figure 1:
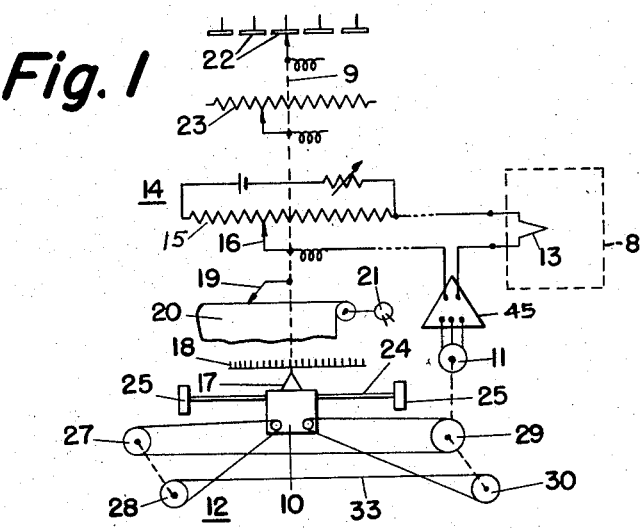

Referring to Fig. 1, the carriage 10 is driven by reversible motor 11 through a pulley and cable system 12, later more specifically described, so that the position of the carriage continuously corresponds with the existing magnitude of a variable as measured by a suitable primary responsive element. For example, for indicating, recording or controlling the temperature of a furnace 8, the output voltage of a thermocouple 13 is opposed to the output voltage of a potentiometer slidewire 15 having a relatively adjustable contact 16. The adjustable element of the slidewire is coupled, as indicated by broken line connection 9, to carriage 10, so that its position also coresponds with the existing temperature. Upon a change in temperature, the opposing voltages are not equal and the potentiometer network 14 is unbalanced. The unbalance voltage is applied as an input signal to amplifier 45 to effect energization of reversible motor 11 in sense corresponding with the unbalance. The carriage 10 is driven in the corresponding direction until the output voltage of the slidewire again balances the thermocouple voltage, whereupon the motor is deenergized leaving the carriage 10 in position corresponding with the changed magnitude of the furnace temperature.

For indicating the existing temperature, the carriage 10 may be provided with or coupled to a pointer 17 movable adjacent to scale 18. For recording the temperature as a function of time, the carriage 10 is provided with or coupled to the marker 19 of a recorder chart 20 continuously driven by chart motor 21. The movable carriage may also be used to actuate switches, represented by contacts 22 for control of the energization of signal lights or of contactors or valves controlling supply of energy to the furnace. The movement of carriage 10 may also be used to adjust the transmitter slidewire 23 of a telemetering system.

As thus far briefly described, the arrangement is similar to prior recorders in which the movements of the recorder carriage by a reversible motor are utilized to effect rebalancing adjustment of a measuring slidewire, the positioning of an indicator or marker and the actuation of control switches. In the prior arrangements, such as shown for example in Williams' Patent 2,113,164 and Larson 2,440,901, the drive from the motor to the recorder carriage includes a speed-reduction mechanism and a separate cable drive from the speed-reduction mechanism to the carriage. In some prior recorders, the speed-reduction mechanism was a spur-gear train, preferably with anti-backlash provision; in other prior recorders, the speed-reduction mechanism included a worm-wheel and worm-gear—sometimes with anti-backlash provisions; in other prior recorders, the speed-reduction was effected by friction wheels. In the arrangements herein described and claimed, the use of a separate speed-reduction mechanism is eliminated and both the amplification of motor torque and its transmission to the recorder carriage are effected by a novel type of cable and pulley system.

Figure 2:
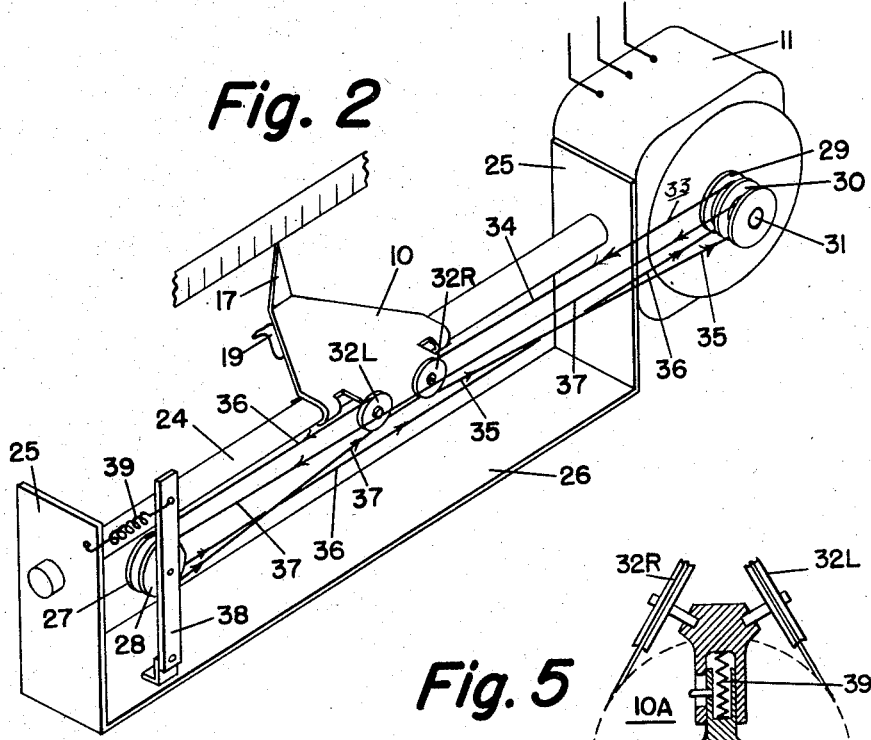
Fig. 2 is a perspective view showing in more detail the construction of the carriage drive system of Fig. 1.

In the arrangement shown in Figs. 1 and 2, the recorder carriage 10 is slidably supported for linear movement by bar structure 24 supported at its opposite ends, beyond the opposite limits of travel of the carriage, by the supporting members 25, 25. As shown in Fig. 2, the bar supports 25, 25 may be the ends of a frame 26 which also supports, beyond the opposite limits of carriage travel, the carriage-actuating motor 11 and the pair of idler pulleys 27, 28. The cable-driving pulleys 29, 30 are attached to the shaft 31 of motor 11.

The cable 33, usually a violin string, is in the form of an endless loop which is folded so that both of its end sections are looped over pulley means, exemplified by pulleys 32R, 32L, on carriage 10. One end section of the cable loop extends from carriage 10 to the right where its lines 34, 35 respectively pass around the driving pulleys 29, 30. The other end section of the cable loop extends from carriage 10 to the left where its lines 36, 37 pass over the idler pulleys 27, 28 and thence respectively to the driving pulleys 29, 30. Tracing the threading of the cable 33 from and back to a particular point along its length, it extends from the top of driving pulley 29 to the left over carriage pulley 32R, thence to the right to the underside of driving pulley 30 around pulley 30 and thence to the left to the top of idler pulley 28, around pulley 28 and thence to the right to carriage pulley 32L, around pulley 32L and thence to the left over idler pulley 27, thence to the right to the underside of drive pulley 29, then around pulley 29 to the starting point.

The cable 33 is thus in the form of a folded endless loop whose two end sections pass over pulley means on the carriage and the opposite sides of whose intermediate section are respectively wrapped around driving pulleys 29, 30. To minimize the possibility of slip, the lines of the intermediate cable section may each be wrapped one or more times around the corresponding driving pulley. The driving pulleys 29, 30 are of somewhat different diameter and therefore have different peripheral velocity though rotated at the same angular velocity by motor 11. Thus the opposite sides of the intermediate section of the cable loop are driven at different linear velocities. As will now be explained, when the motor 11 is energized, the carriage 10 will move to the right or left depending upon the direction of rotation of the motor and at a speed dependent upon the difference in peripheral velocities of the drive pulleys 29, 30 for any motor speed.

This can be more clearly understood if it first be assumed that pulleys 29, 30 have the same peripheral velocity. In such case, all points of the cable have the same linear velocity, and assuming counterclockwise rotation of motor shaft 31, the pulley 29 would feed cable from line 36 of loop section 36, 37 to line 34 of loop section 34, 35 at the same rate that pulley 30 would feed cable from line 35 of loop section 34, 35 to line 37 of loop section 36, 37. Thus, in such assumed case, the individual lengths of the two end sections of the endless cable would remain fixed despite the movement of the cable over the pulleys and the carriage would remain stationary. When however, as in the construction shown, the diameter of drive pulley 29 is somewhat greater than the diameter of drive pulley 30, the rate at which pulley 29 feeds cable from line 36 of loop section 36, 37 to line 34 of loop section 34, 35 is greater than the rate at which the pulley 30 feeds cable from line 35 of loop section 34, 35 to line 37 of loop section 36, 37. Thus, for counterclockwise rotation of motor shaft 31, the length of loop section 36, 37 is progressively shortened and the length of loop section 34, 35 is correspondingly lengthened. Therefore carriage 10 moves to the left along bar structure 34 at a rate dependent upon the difference between the peripheral velocities of the two driving pulleys 29, 30 and the corresponding difference between the linear velocities of the opposite sides of the cable loop. It can similarly be shown that for clockwise rotation of shaft 31, the length of loop section 34, 35 is progressively shortened and the length of loop section 36, 37 is correspondingly lengthened. Thus, for clockwise rotation of shaft 31, the carriage 10 is positively driven to the right at a rate dependent upon the difference between the peripheral velocities of the driving pulleys 29, 30. The arrows in Fig. 2 indicate the direction of movement of the various lines of the cable for counterclockwise rotation of motor shaft 31: all arrows would be reversed for clockwise rotation of shaft 31.

It is important that all lines of the cable 33 be taut and free to move concurrently. Such tautness is maintained in the construction shown in Fig. 2 by supporting the idlers 27, 28 on an arm 38 which is pivotally supported from the frame 26 and which is biased by spring 39 away from the carriage 10 and the driving pulleys 29, 30. Thus, despite the effects of ambient conditions, such as humidity and temperature, upon the overall length of the cable loop, all lines of the cable are maintained under tension for positive drive of the carriage in both directions and without lost motion. It should be noted that any compensating movement of the idlers 27, 28 by the biasing spring does not affect the accuracy of the indication, record trace or control since the position of the carriage for any given magnitude of the measured variable is determined by the position of contact 16 of rebalancing slidewire 15—not by the length of either looped section of the cable, the relative lengths of those sections, or the total length of the cable.

In the construction shown in Figs. 1 and 2, the driving pulleys 29, 30 also serve as guide pulleys with fixed axes of rotation beyond the right-hand limit of travel of the carriage. The idler pulleys 27, 28 serve as cable guide pulleys with fixed axes of rotation beyond the left-hand limit of travel of the carriage. These two pairs of guide pulleys have their fixed axes of rotation in substantial alignment with the axis of the carriage pulleys so that the pairs of cable lines 34, 35 and 36, 37 as extending in opposite directions from the carriage are always substantially parallel to the path of travel of the carriage. When the motor 11 is deenergized, the opposing forces applied by the pairs of cable lines to the carriage 10 are in balance and the carriage remains stable in the position to which moved by motor 11. When motor 11 is energized, these opposing forces are unbalanced and their resultant is of sign or sense corresponding with the direction of rotation of the motor.

Figure 5:
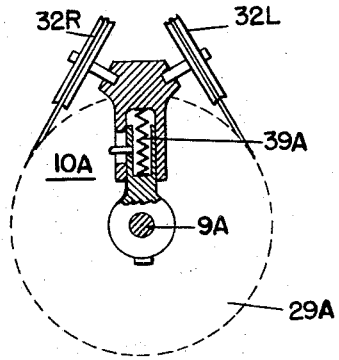
Fig. 5 is an end view, partly in section, of the recorder-carriage of Fig. 4.

In Figs. 3 to 5, there is shown another modification of the invention as embodied in a recorder construction in which the recorder carriage is positioned in an angular path of movement instead of in a linear path, as in the preceding figures. The corresponding elements of both constructions are identified by the same reference characters with addition of the suffix A for the elements of Figs. 3 to 5. With this explanation, it will become clear that the relationships of the cable sections to the carriage and to the driving pulleys are essentially the same as in the construction of Figs. 1 and 2.

The recorder carriage 10A is attached to and extends radially from the shaft 9A for rotation about the axis X—X. To shaft 9A are also attached or coupled the pointer 17A and the supporting disc 40 of rebalancing and repeater slidewires 15A, 23A and of the control contacts 22A, so that the positions of these elements at all times correspond with the angular position of carriage 10A. To effect movement of a marker radially of a round-chart, additional structure, such as shown for example in copending Moore application Serial No. 531,335, now Patent No. 2,847,269, filed August 30, 1955, is driven from shaft 9A through a drum and cable arrangement. In the particular construction shown, the shaft 9A passes freely through the hub of pulley 27A, one of the pair of pulleys 27A, 28A which are both supported for rotation about axis X—X.

The pulleys 32R, 32L are rotatably mounted on carriage 10A with their axes of rotation in a plane normal to the axis of rotation of X—X of the carriage and intermediate the pulleys 29A, 30A. The cable lines from the pulleys 32R, 32L extend in opposite directions over pulleys 27A, 28A to the peripheries of the driving pulleys 29A, 30A on the motor shaft. As in Figs. 1 and 2, the cable 33A is an endless loop, both of whose end sections pass over pulley means on the carriage and extend therefrom in different directions to the driving pulleys where the opposite sides of the intermediate section of the cable loop respectively pass around the driving pulleys.

In Figs. 3 to 5, the intermediate section of the loop passes over the driving pulleys 29A, 30A of slightly different diameter and one side of such intermediate cable section is crossed so that the pulleys 27A, 28A are concurrently rotated in opposite directions. As in Figs. 1 and 2, because of the difference in peripheral velocities of the driving pulleys, one of the end sections of the cable loop is shortened and the other correspondingly lengthened when motor 11A is energized. Thus, the carriage 10A is moved angularly in direction corresponding with the direction of rotation of the motor and at a speed dependent upon the difference in peripheral velocities of the pulleys 29A, 30A. As in Figs. 1 and 2, the amplification of the motor torque (Figs. 3-5) is effected by the cable pulley system 12A itself without need for any separate speed-reduction mechanism.

To maintain the cable taut, despite changes in ambient conditions, the spring 39A (Fig. 5) biases the pulley mount portion of carriage 10A outwardly from its axis of rotation. When the motor 11A is deenergized, the cable lines extending from the carriage 10A to the opposite sides of the driving pulleys apply balanced forces to the carriage so that it remains stably in the position to which moved by the motor. When the motor is energized, these forces are unbalanced and the carriage rotates about axis X—X as above described.

In Fig. 6, there is shown another embodiment of the invention in which the recorder carriage is positioned in an angular path of movement. The corresponding elements are identified by the same reference characters as in the preceding modifications but with the suffix B. With this explanation, it should be evident that the relationships of the cable sections to the carriage and to the driving pulleys are essentially the same as in the preceding modifications.

The recorder carriage 10B is attached to and extends radially from shaft 9B for rotation about axis X—X. To shaft 9B are also attached, as in Figs. 3, 4, the supporting discs for the control contacts and the rebalancing and repeater slidewires so that the positions of such elements at all times correspond with the angular position of carriage 10B. The shaft 9B is supported by suitable bearings in axial alignment with the shaft 31B to which the cable-driving pulleys 29B, 30B are attached. These driving pulleys are of slightly different diameter, as in the preceding modifications, to provide high torque amplification within the pulley drive system.

The idler pulleys 32RB, 32LB are rotatably mounted on carriage 10B with their axes of rotation spaced from one another and parallel to the axis of rotation X—X of the carriage and of the driving pulleys. The distance from the axis X—X to the axis of rotation of each of the idler pulleys is suitably greater than the radius of the larger of the driving pulleys. The cable lines from each of the idler pulleys extend in opposite directions over each of the driving pulleys. As in the preceding modifications, the cable 33B is an endless loop, both of whose end sections pass over pulley means on the carriage and extend therefrom in different directions to the driving pulleys where the opposite sides of the intermediate section of the cable respectively pass around the driving pulleys.

Because of the difference in peripheral velocities of the driving pulleys 29B, 30B, the energization of motor 11B in either sense effects shortening of one end section of the cable loop and a concurrent corresponding lengthening of the other end section of the cable loop. Thus the carriage 10B is moved angularly about axis X—X in one direction or the other depending upon the sense of energization of motor 11B and, for any given motor speed, at a speed dependent upon the difference in peripheral velocities of the driving pulleys 29B, 30B.

To maintain the cable taut, under varying ambient conditions, the springs 39B bias the axis of rotation of pulley 32RB away from the axis of rotation of pulley 32LB. When motor 11B is deenergized, the cable lines extending from carriage 10B to the opposite sides of the driving pulleys 29B, 30B apply balanced forces to the carriage so that it remains stably in the position to which moved during energization of the motor. When motor 11B is energized, these forces are unbalanced and the resultant rotates the carriage about axis X—X as above described to a position corresponding with the new magnitude of the measured variable.

It shall be understood that the invention is not limited to the embodiments specifically illustrated and described and that changes may be made within the scope of the appended claims.

What is claimed is:

1. A recorder having a carriage to be positioned in accordance with the magnitude of a measured variable, a reversible motor means energized in sense dependent upon the sense of change of the measured variable, and a cable and pulley system coupling said motor means to said carriage to effect positive drive thereof in opposite directions and with amplification of the motor torque comprising pulley means on the recorder carriage, an endless cable loop having end sections each looped over said carriage-pulley means and each comprising a pair of lines extending therefrom, each of said pair of lines of said looped end sections respectively being continuations of opposite sides of the intermediate driven section of the endless cable loop, and a pair of driving pulleys about which are respectively wound opposite sides of the cable loop intermediate said end sections thereof, said pair of driving pulleys being concurrently driven from said motor means at different peripheral velocities to shorten one of said end sections and correspondingly to lengthen the other of said end sections so to effect movement of said carriage in direction dependent upon the sense of energization of said motor means and at a speed dependent upon the difference in peripheral velocities of said pair of driving pulleys and corresponding with the difference between the linear velocities of said opposite sides of the endless cable loop.

2. A recorder as in claim 1 in which structure is provided slidably to support the carriage for travel in opposite directions in a linear path, in which a pair of idler pulleys is disposed beyond one limit of travel of the carriage, in which the driving pulleys are attached to the motor shaft beyond the opposite limit of travel of the carriage and are of different diameters, in which the lines of one of said end sections of cable extend directly from the carriage respectively to said driving pulleys, and in which the lines of the other of said end sections pass over said idler pulleys and thence respectively to said driving pulleys.

3. A recorder as in claim 2 in which the idler pulleys are biased to keep the cable sections taut for balance of the forces applied to said recorder carriage in absence of energization of the motor means and to insure positive drive of all lines of the loop sections by the motor means when energized.

4. A recorder as in claim 1 in which the carriage is mounted for angular movement about an axis; and in which pulleys mounted for rotation about said axis are driven by said motor means and at different peripheral velocities to effect angular movement of said carriage in direction dependent upon the sense of energization of said motor means and at a rate dependent upon the difference in peripheral velocities of said pulleys.

5. A recorder as in claim 4 in which the pulleys mounted for rotation about the carriage axis are driven by said motor means independently of one another in opposite directions and at different peripheral velocities.

6. A recorder as in claim 4 in which the pulleys mounted for rotation about the carriage axis are driven by said motor means in the same direction and at different peripheral velocities.

7. A recorder as in claim 4 in which the carriage pulley means is biased radially of the axis of rotation of the carriage to keep the looped cable sections taut for balance of the forces applied to the recorder carriage in absence of energization of the motor means and to insure positive drive of all lines of the loop sections by the motor means when energized.

8. A recorder as in claim 4 in which the carriage-pulley means comprises pulleys biased apart to keep the looped cable sections taut for balance of the forces applied to the recorder carriage in absence of energization of the motor means and to insure positive drive of all lines of the loop sections by the motor means when energized.

9. A recorder having a carriage to be positioned in accordance with the magnitude of a measured variable, reversible motor means energized in sense dependent upon the sense of change of the measured variable, a pair of pulleys concurrently driven by said motor means at different peripheral velocities, an endless cable loop having opposite sides of an intermediate section thereof respectively driven by different pulleys of said pair for movement of said opposite sides at different linear velocities and in opposite directions and having looped end sections which extend from said pulleys and whose lengths are complementarily varied in accordance with said difference in linear velocities, and structure on said carriage about which said end sections of the cable are looped so that said complementary variation of the lengths of said end sections produces movement of said carriage at a speed dependent upon the aforesaid difference between the linear velocities of opposite sides of the endless cable loop and in direction dependent upon the sense of energization of said motor means.

References Cited in the file of this patent

UNITED STATES PATENTS

| | | |
|---|---|---|
| 1,879,294 | Jones et al. | Sept. 27, 1932 |
| 2,630,716 | Depweg | Mar. 10, 1953 |
| 2,760,139 | Luebking | Aug. 21, 1956 |